US012496529B2

(12) United States Patent
Yao et al.

(10) Patent No.: US 12,496,529 B2
(45) Date of Patent: Dec. 16, 2025

(54) METHOD FOR PERSONALIZING A VIDEO GAME TROPHY

(71) Applicant: Sony Interactive Entertainment Inc.

(72) Inventors: Chen Yao, Bloomingdale, IL (US); Nobuyuki Nakamura, Yokohama (JP); Sagnik Chowdhury, San Jose, CA (US); Ratnakar Pawar, Redwood City, CA (US); Robert Brown, Lafayette, CA (US); Jun Murakawa, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 347 days.

(21) Appl. No.: 18/219,621

(22) Filed: Jul. 7, 2023

(65) Prior Publication Data

US 2025/0010208 A1 Jan. 9, 2025

(51) Int. Cl.

| | |
|---|---|
| ***A63F 13/798*** | (2014.01) |
| ***A63F 13/497*** | (2014.01) |
| ***A63F 13/533*** | (2014.01) |
| ***A63F 13/803*** | (2014.01) |

(52) U.S. Cl.

CPC .......... *A63F 13/798* (2014.09); *A63F 13/497* (2014.09); *A63F 13/533* (2014.09); *A63F 13/803* (2014.09)

(58) Field of Classification Search

CPC .... A63F 13/798; A63F 13/497; A63F 13/533; A63F 13/803

See application file for complete search history.

(56) References Cited

U.S. PATENT DOCUMENTS

| | | | |
|---|---|---|---|
| 6,352,479 | B1 | 3/2002 | Sparks |
| 8,515,253 | B2 | 8/2013 | Cottrell |
| 9,364,743 | B2 | 6/2016 | Miura et al. |
| 9,457,264 | B1 | 10/2016 | Chyou et al. |
| 9,630,097 | B2 | 4/2017 | Paradise et al. |

(Continued)

FOREIGN PATENT DOCUMENTS

| | | | |
|---|---|---|---|
| WO | 2014100770 | A2 | 6/2014 |
| WO | 2021156848 | A1 | 8/2021 |

OTHER PUBLICATIONS

"Dynamic resolution Scaling has become a common" Ask a Game Dev, Published, Nov. 24, 2020. Accessed Jun. 14, 2023, Available Online at: https://askagamedev.tumblr.com/post/635692229684510720/dynamic-resolution-scaling-has-become-a-common.

(Continued)

*Primary Examiner* — Reginald A Renwick

(74) *Attorney, Agent, or Firm* — Kilpatrick Townsend & Stockton LLP

(57) ABSTRACT

Embodiments of the present disclosure may include a method for enhancing a video game trophy, including detecting an end game state to a video game corresponding to award of a trophy. Embodiments may also include extracting metadata relating to a structure of the end game state from gameplay information associated with award of the trophy. Embodiments may also include determining metrics for the end game state from the metadata. Embodiments may also include applying a drama engine to the metrics for the end game state to generate commentary data corresponding to commentary on the award of the trophy.

20 Claims, 9 Drawing Sheets

(56) References Cited

U.S. PATENT DOCUMENTS

| | | | |
|---|---|---|---|
| 9,782,678 | B2 | 10/2017 | Long et al. |
| 10,335,690 | B2 | 7/2019 | Schleicher |
| 10,456,680 | B2 | 10/2019 | Miron et al. |
| 11,071,910 | B1 | 7/2021 | Landers et al. |
| 11,338,210 | B2 | 5/2022 | Benedetto et al. |
| 2001/0016510 | A1 | 8/2001 | Ishikawa et al. |
| 2006/0046234 | A1 | 3/2006 | Sperry |
| 2010/0144444 | A1 | 6/2010 | Graham |
| 2011/0246621 | A1 | 10/2011 | May et al. |
| 2011/0269540 | A1 | 11/2011 | Gillo et al. |
| 2011/0295649 | A1 | 12/2011 | Fine et al. |
| 2012/0202594 | A1 | 8/2012 | Bistis et al. |
| 2013/0079134 | A1 | 3/2013 | Walker et al. |
| 2013/0249947 | A1 | 9/2013 | Reitan |
| 2013/0260894 | A1 | 10/2013 | Graf et al. |
| 2014/0038701 | A1 | 2/2014 | Allen et al. |
| 2014/0162780 | A1 | 6/2014 | Suzuki |
| 2014/0258469 | A1 | 9/2014 | Maharajh et al. |
| 2014/0278686 | A1 | 9/2014 | Mullings et al. |
| 2014/0335963 | A1 | 11/2014 | Wolters et al. |
| 2015/0157938 | A1 | 6/2015 | Domansky et al. |
| 2015/0231502 | A1 | 8/2015 | Allen et al. |
| 2016/0255409 | A1 | 9/2016 | Feldstein et al. |
| 2017/0064014 | A1 | 3/2017 | Nomura |
| 2017/0087460 | A1 | 3/2017 | Perry |
| 2017/0259177 | A1 | 9/2017 | Aghdaie et al. |
| 2018/0018684 | A1 | 1/2018 | Orr et al. |
| 2018/0365935 | A1 | 12/2018 | Howell et al. |
| 2020/0061465 | A1* | 2/2020 | Benedetto ............... A63F 13/55 |
| 2020/0078685 | A1 | 3/2020 | Aghdaie et al. |
| 2020/0122031 | A1 | 4/2020 | Sherwani et al. |
| 2020/0139245 | A1 | 5/2020 | Jarzebinski |
| 2020/0222810 | A1 | 7/2020 | Ntoulas et al. |
| 2020/0242640 | A1 | 7/2020 | Nielsen et al. |
| 2020/0289932 | A1 | 9/2020 | Benedetto et al. |
| 2021/0038998 | A1 | 2/2021 | Tallarico et al. |
| 2021/0086089 | A1 | 3/2021 | Pardeshi et al. |
| 2021/0093968 | A1* | 4/2021 | McCoy ............... A63F 13/5258 |
| 2021/0146241 | A1 | 5/2021 | Bleasdale-Shepherd et al. |
| 2021/0151034 | A1 | 5/2021 | Hasan et al. |
| 2021/0213353 | A1 | 7/2021 | Berg et al. |
| 2021/0370183 | A1 | 12/2021 | Dorn et al. |
| 2022/0019744 | A1 | 1/2022 | Yu et al. |
| 2022/0096937 | A1 | 3/2022 | Dorn et al. |
| 2022/0358917 | A1 | 11/2022 | Chaland et al. |
| 2023/0078380 | A1 | 3/2023 | Zaghetto et al. |

OTHER PUBLICATIONS

Battaglia, Alex "Radeon Boost analysed: is AMD's new dynamic resolution technology a game-changer?" Eurogamer, Published Dec. 19, 2019. Accessed: Jun. 14, 2023, Available at: https://www.eurogamer.net/digitalfoundry-2019-radeon-software-adrenalin-2020-radeon-boost-analysis.

Cheng, et al. "TallFormer: Temporal Action Localization with a Long-memory Transformer" Dept. of Comp. Sci. Univ. of North Carolina at Chapel Hill, ArXiv, Jul. 26, 2022, Available at: https://arxiv.org/pdf/2204.01680.pdf.

Clark et al. "ELECTRA: Pre-training Text Encoders as Discriminators Rather Than Generators" ArXiv abs/2003. 10555, 2020.

D. Sasirekha et al. "Text to Speech: A simple Tutorial" Int. J. of Sort Computing and Eng. (IJSCE) vol. 2 Iss. 1 Mar. 2012 ISSN: 2231-2307.

Dutoit, Thierry "High Quality Text to Speech Synthesis: An Overview" Faculte Polyechnique de Mons, TCTS lab, 1997.

Fuzhen Zhuang et al. "A Comprehensive Survey on Transfer Learning" In Proceedings of the IEEE, vol. 109, No. 1, pp. 43-76, Jan. 2021.

Hdeep "What Is Dynamic Resolution Scaling? Real-time Rendering will Prioritize the FPS" Define CPU, Aug. 22, 2022, Accessed: Jun. 14, 2023, available at: https://definecpu.com/dynamic-resolution-scaling/.

Hochreiter & Schmidhuber "Long Short-term memory" Neural Computation 9(8):1735-1780 (1997).

Nadkarni et al. "Natural Language Processing: an introduction" J. Am. Med. Assoc. 2011; 18:544-551 accessed Jun. 27, 2023.

Radford et al. "Improving Language Understanding by Generative Pre-training" Open AI, Jun. 2018.

U.S. Appl. No. 18/208,159 to Rathish Krishnan et al., filed Jun. 9, 2023.

U.S. Appl. No. 18/208,166 to Chen Yao et al., filed Jun. 9, 2023.

U.S. Appl. No. 18/208,179 to Chen Yao et al., filed Jun. 9, 2023.

U.S. Appl. No. 18/208,191 to Chen Yao et al., filed Jun. 9, 2023.

U.S. Appl. No. 18/208,200 to Chen Yao et al., filed Jun. 9, 2023.

Vaswani, Ashish; Shazeer, Noam; Parmar, Niki; Uszkoreit, Jakob; Jones, Llion; Gomez, Aidan N .; Kaiser, Lukasz; Polosukhin, Illia (Dec. 5, 2017). "Attention Is All You Need". arXiv:1706.03762.

International Search Report and Written Opinion for International Application No. PCT/US2024/030753, dated Aug. 22, 2024.

International Search Report and Written Opinion for International Application No. PCT/US2024/030758, dated Aug. 15, 2024.

International Search Report and Written Opinion mailed Aug. 15, 2024 for International Patent Application No. PCT/US2024/026472.

* cited by examiner

METHOD FOR PERSONALIZING A VIDEO GAME TROPHY

FIELD OF THE DISCLOSURE

The present invention relates generally to computer-simulated video games, and more specifically to providing personalized enhancements to video game trophies.

BACKGROUND OF THE DISCLOSURE

Trophies in video games are a form of achievement or recognition awarded to players for accomplishing specific tasks, goals, or milestones within a game. They are often implemented as a way to provide additional challenges and incentives for players to explore different aspects of the game and engage in various activities.

Trophies may be classified into different categories, such as story-based, skill-based, collectibles, multiplayer accomplishments, and more. Story-based trophies are often earned by progressing through the game's main storyline or completing significant quests. Skill-based trophies require the player to demonstrate proficiency in specific game mechanics or challenges. Collectibles trophies involve finding and gathering hidden items throughout the game world. Multiplayer trophies, as the name suggests, are awarded for achievements in online or multiplayer modes.

Trophies can add a layer of engagement and enhance the experience of replaying video games.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Figure 1A:
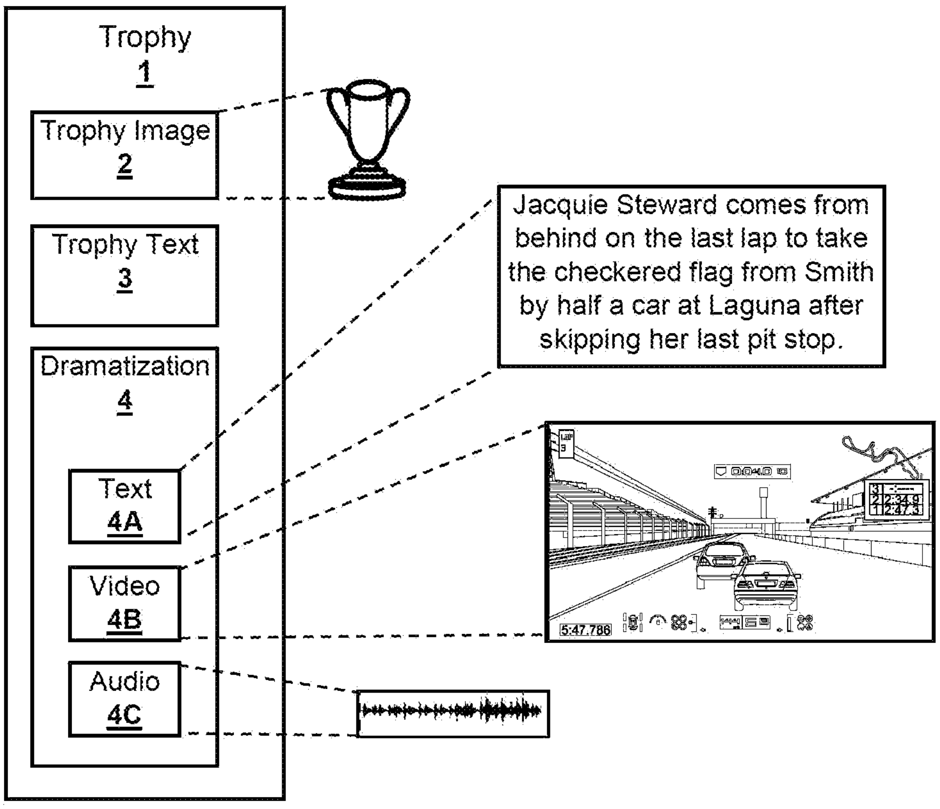
FIG. 1A is a diagram illustrating an example of a trophy combined with commentary according to aspects of the present disclosure.

Generally speaking, the various embodiments of the present disclosure describe systems and methods for personalizing gaming trophies by dramatizing one or more game plays of players playing a gaming application that led up to the award of a trophy and combining the resulting dramatization with the trophy. Trophies enhanced in this manner may add to the enjoyment of games and improve player retention. FIG. 1A diagrammatically depicts an example of an enhanced video game trophy 1 according to aspects of the present disclosure. The trophy may be a virtual item generally comprising data, which may include image data 2 representing the trophy itself. The trophy image data may correspond to still or video data corresponding to the trophy. The trophy image data 2 may also include audio data, e.g., music or sound effects. The trophy data may include trophy text data 3, which may specify the particulars of the trophy, e.g., the player or character who won the trophy, the game title, the trophy title, the event (e.g., tournament) at which the trophy was won and the date the trophy was won or awarded.

According to aspects of the present disclosure, the trophy data further includes dramatization data 4. The dramatization may include a text component 4A, a video component 4B, and an audio component 4C. The text component 4A may include a brief description of the circumstances under which the trophy was won. The video component 4B may include recorded or synthesized gameplay video showing a dramatic moment from the events that led to the award of the trophy. In some implementations, the video may be synthesized from gameplay data. For example, game physics data for a given time step may be used to generate a three-dimensional set of vertices representing characters and/or objects in a scene for a frame of gameplay video. The vertices may then be subject to computer graphics processing that converts each set of vertices to a set of polygons, which may be projected onto a two-dimensional screen space. Textures may be applied to the projected polygons and rendered as pixel data for the video frame. Synthesizing video from three-dimensional vertices in this manner allows video frames to be generated from an arbitrary camera angle.

The audio component 4C may include commentary by an announcer, music, sound effects, or some combination of two or more of these. Such sounds may be recorded or synthesized. Any or all of these sounds may be chosen for their dramatic effect.

Figure 1B:
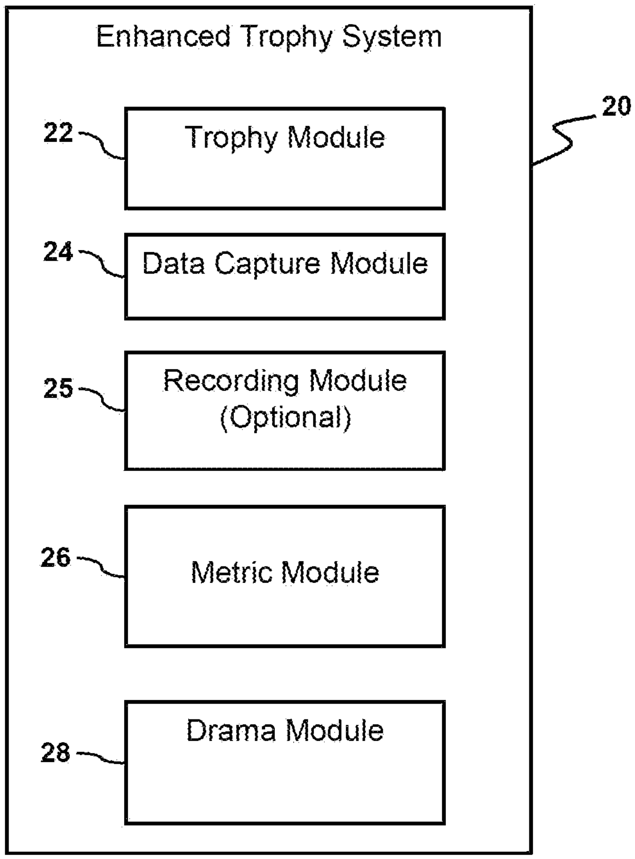
FIG. 1B is a diagram of an example of a system for enhancing a video game trophy according to an aspect of the present disclosure.

FIG. 1B is a block diagram that describes a system 20 for enhancing a video game trophy according to some embodiments of the present disclosure. In the illustrated example, the system includes a trophy module 22, a data capture module 24, a metric module 26, and a dram module 28. These components may be implemented in hardware, e.g., specialized integrated circuits, software, e.g., executable code for a general-purpose computer, or some combination of hardware and software.

The trophy module 22 is configured to detect an end game state to a video game corresponding to award of a trophy. In some implementations, the system 20 may further include, an optional recording module 25, which may be configured to record gameplay information for a video game starting at an initial game state. In such implementations, the trophy module 22 may be configured to detect the end game state from the recorded gameplay information.

The data capture module 24 is configured to extract metadata relating to a structure of the end game state from gameplay information associated with award of the trophy. The metric module 26 is configured to determine metrics for the end game state from the metadata. In some embodiments, the metric module 26 may be configured to determine a change in metrics between an initial game state and the end game state. The drama module 28 is configured to use the metrics for the end game state to generate commentary data corresponding to commentary on the award of the trophy. In some implementations, the drama module 28 may be configured to generate a prompt from a timeline of events occurring within the video game between the initial game state and the end game state.

Operation of the system 20 and its components may be understood by referring to FIG. 1C and the discussion below.

Figure 1C:
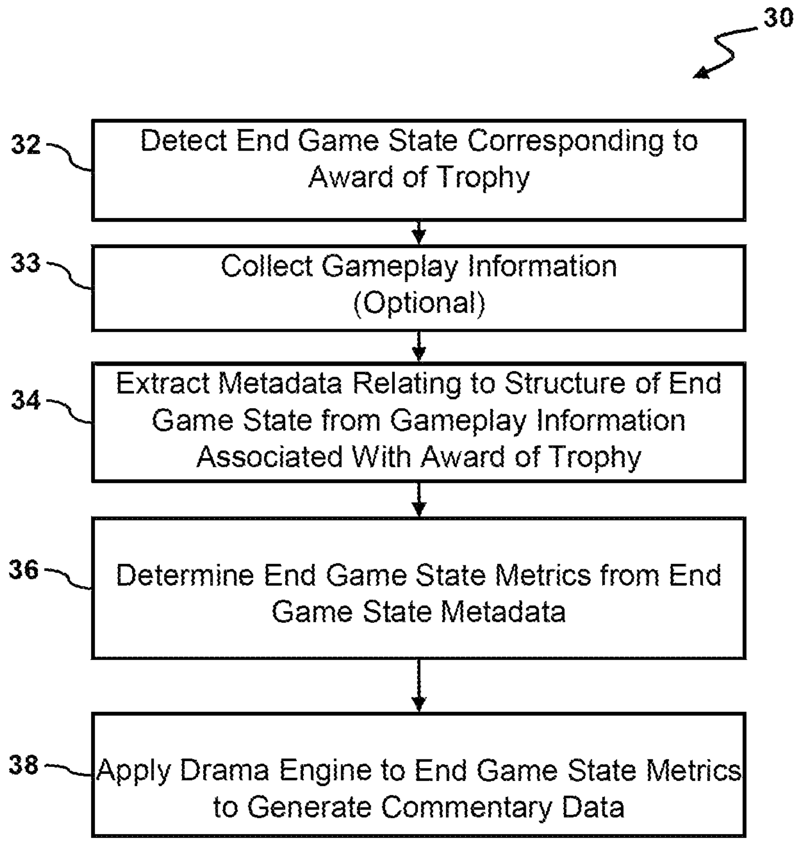
FIG. 1C is a flow diagram illustrating a method for enhancing a video game trophy, according to some embodiments of the present disclosure.

FIG. 1C is a flowchart that describes a method 30 for enhancing a video game trophy, according to some embodiments of the present disclosure. In the illustrated embodiment, the method includes detecting an end game state to a video game corresponding to award of a trophy, as indicated at 32. By way of example, many games present a special image, video, text, image or audio, when a trophy is awarded to a player. Such trophy indicators may be detected by a suitably configured computer module implemented in software and/or hardware. In some implementations, as indicated at 33, the method may optionally include collecting gameplay information for the video game starting at an initial game state. The end game state may be detected from the recorded gameplay information. Metadata relating to a structure of the end game state may be extracted from gameplay information associated with award of the trophy, as indicated at 34. As used herein, the structure of a given game state, such as the end game state, refers to a set of gameplay information corresponding to what is happening in the game in the given state. The metadata may include (1) player position, (2) object positions, (3) game level or map information, e.g., terrain layout, environmental properties, boundaries, and specific triggers or events associated with that level, (4) game progress, e.g., completed objectives, unlocked levels or areas, collected items, or achievements. (5) in-game time and timing, e.g., day-night cycles or time-based events, (5) player character health stats, e.g., lives or stamina or, for vehicles, damage received or fuel remaining, (6) game state flags, i.e., Boolean values that indicate the state of certain game conditions or events, (7) quest or mission status, (8) inventory and equipment, such as weapons, armor, or other equipment the player possesses.

Metrics for the end game state may then be determined from the metadata, as indicated at 36. A drama engine is applied to the metrics to generate commentary data corresponding to commentary on the award of the trophy, as indicated at 38. As used herein, metrics refers to quantifiable measurements that help assess and compare different aspects of gaming performance. These metrics can then be utilized to create a personalized and detailed commentary for the trophy, enhancing the player's sense of accomplishment and engagement with the game. Metrics may be thought of as a refined form of metadata that help quantify the type and degree of drama of the events leading up to the award of the trophy. Such metrics may, for example, gauge the type and degree of difficulty of completing a task that leads to the award of a trophy. For example, a player who wins a race by a tenth of a second after coming from behind in the last lap may have had a different and more challenging experience than a player who wins the race by a minute after leading from start to finish. Alternatively, such metrics may characterize the difficulty of the task relative to the experience or skill level of the player. Furthermore, the metrics may characterize the events in a convenient form for narration. For example, the metrics may be in the form of a timeline of events occurring between an initial game state and the end game state. Such a timeline may specify specific times at which events occurred or may specify an order in which events occurred.

In some implementations, the metrics for the end game state may be determined from the metadata by analyzing a change in metrics between an initial game state and the end game state. By way of example, the change in metrics may include an amount of time elapsed between the initial game state and the end game state, a change in a player character asset or player character location, in-game items, such as weapons or equipment that the player was using, or in-game items that the player had ever used. In some such implementations gameplay information may be collected starting at the initial game state and the end game state may be detected from the recorded gameplay information. In other such implementations, the method may further comprise generating a prompt from a timeline of events occurring within the video game between the initial game state and the end game state. In such implementations applying the drama engine to the metrics for the end game state to generate the commentary data may include entering the prompt into a natural language processing artificial intelligence (AI) Chabot, such as ChatGPT.

In alternative implementations, applying the drama engine to the metrics for the end game state to generate the commentary may include identifying one or more events. By way of example, and not by way of limitation, consider a racing game in which the metrics indicate that a racer named "Jacquie Steward" in eleventh position at the beginning of the last lap came from behind to win. The drama engine may infer from the metrics that the player had to pass ten other racers including the racer that was leading at the beginning of the lap. The drama engine may incorporate the event, i.e., passing ten other racers on the last lap", into a prompt for an AI Chabot, e.g., as "Steward wins on last lap after passing 10 racers ahead of her".

In some implementations, the commentary data may be associated with trophy data corresponding to the trophy, e.g., as shown in FIG. 1A. The commentary data and the trophy data may be associated in a way that the commentary on the award of the trophy is presented automatically when the trophy is viewed using the trophy data. For example, the trophy data 1 may be configured to trigger a player's device to play audio corresponding to the audio data 4C when the player views the trophy image 2 with the device. The player's device may be similarly configured to present the text 4A and/or video 4B when the trophy image is viewed. In some implementations the audio data 4C may include synthesized audio commentary data. Such audio commentary may be generated, e.g., by entering the prompt into a natural language processing artificial intelligence Chabot to generate text commentary and then provide the text commentary as input to a speech synthesizer program, such as Speechify from Speechify, Inc. of Kentfield, California, Google Text-to-Speech from Google LLC of Mountain View, California, and Amazon Polly from Amazon Web Services, Inc. of San Francisco, California. Other speech-to-text software is available from ElevenLabs of New York, New York and the open source Silero model. Furthermore, the commentary data may include video data 4C. In other implementations, the commentary data may include both video data and synthesized audio commentary data. In addition, the commentary data may include text data.

Figure 2A:
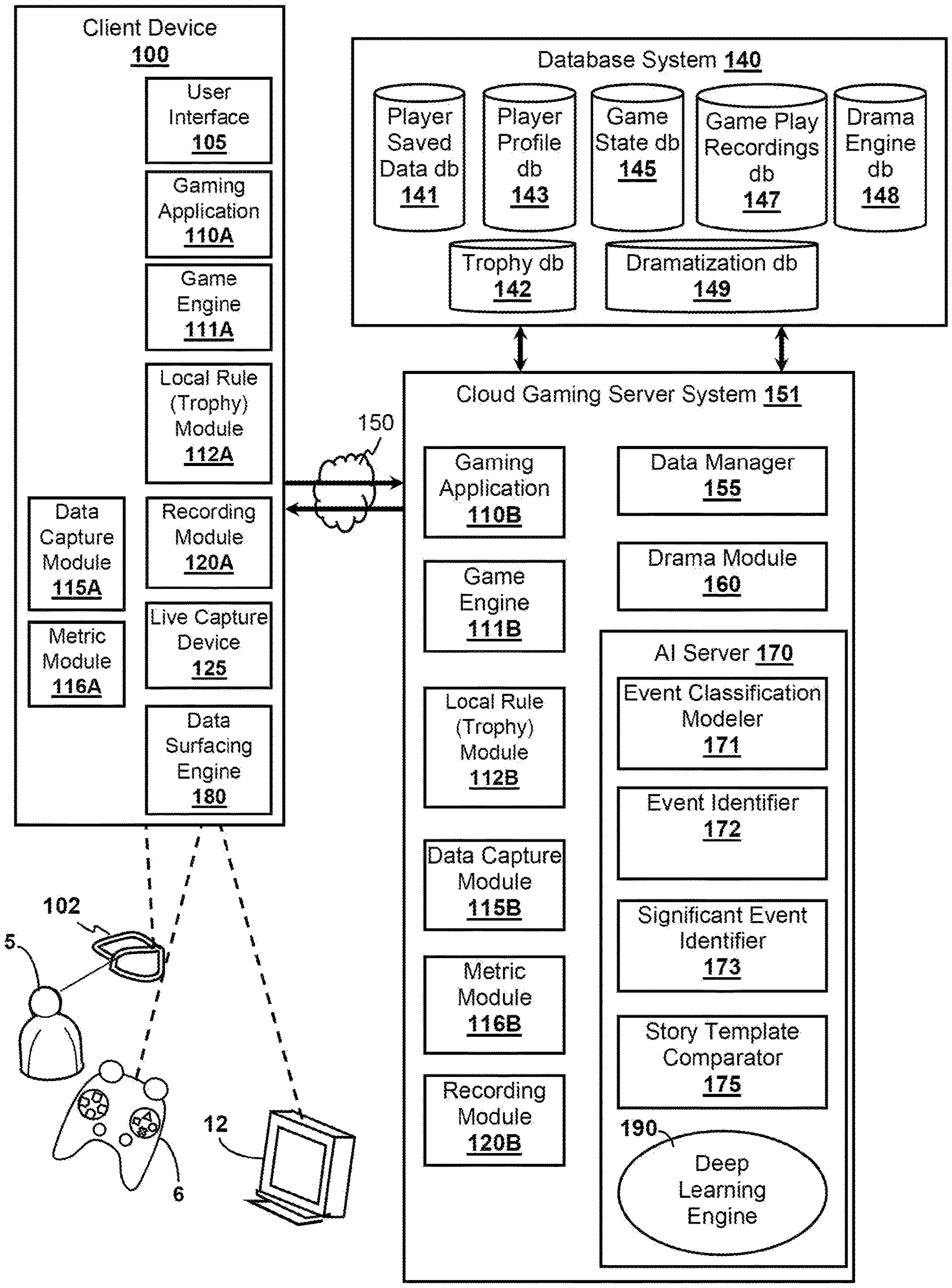
FIG. 2A is a diagram of a system for generating personalized trophies according to an aspect of the present disclosure.
Figure 2B:
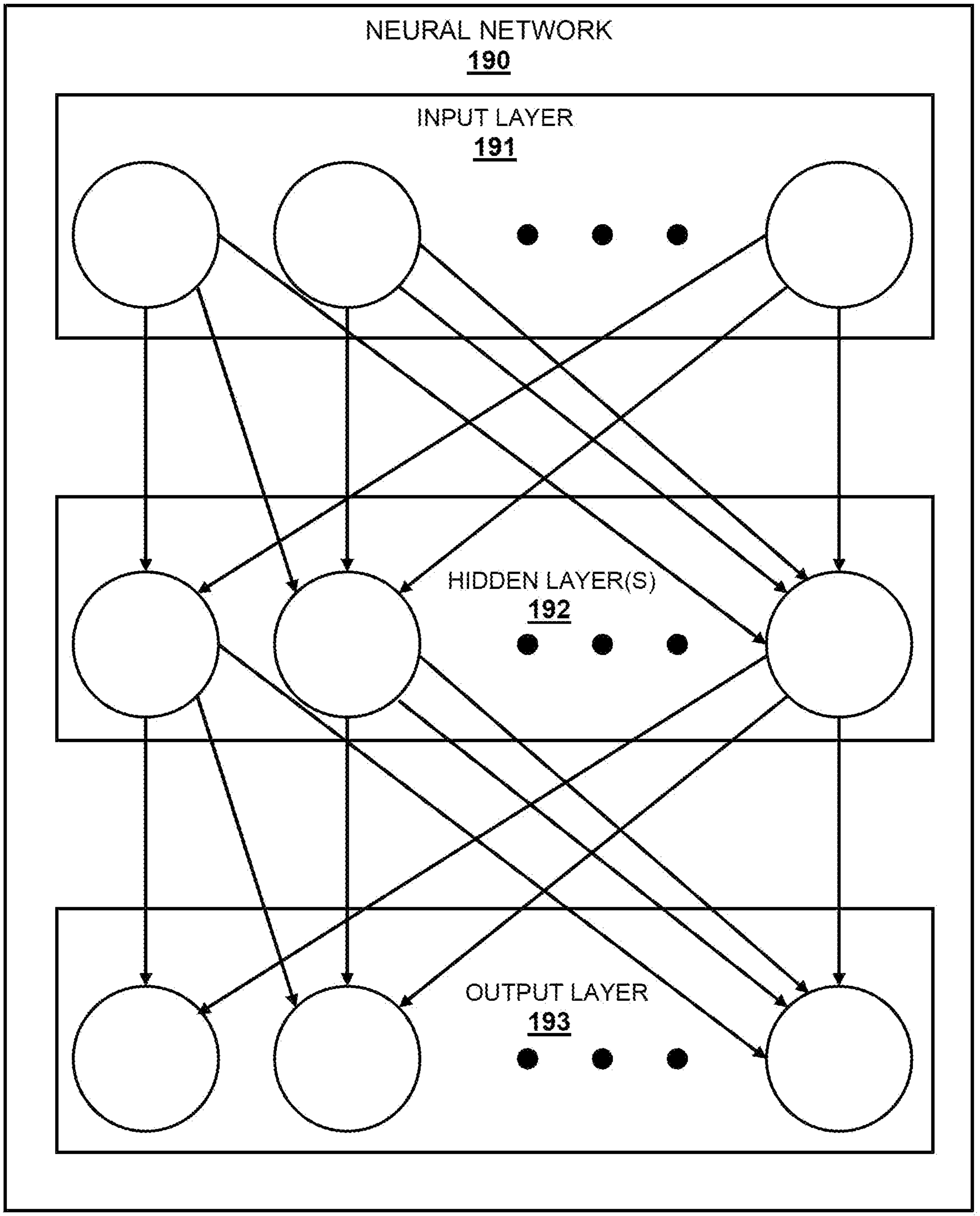
FIG. 2B illustrates an example neural network used for generating dynamic trophies according to an aspect of the present disclosure.

According to aspects of the present disclosure, there are many possible configurations for the system 20 of FIG. 1B. By way of example, and not by way of limitation, FIG. 2 is a diagram of an example of a system 100A for generating personalized trophies according to an aspect of the present disclosure. The system may be configured to dramatize game play of a player 5 playing a game via an interactive gaming application 110A that leads to award of a trophy to the player. In the illustrated example, the player 5 plays a game on a client device 100 through a user interface 105. The player may provide inputs to the gaming application via an input device 6, such as a gaming controller, keyboard, microphone, or video camera coupled to the user interface, which may be coupled to the user interface. The gaming application 110A produces outputs that the player 5 may perceive through suitable output devices, such as a display device 12 or head-mounted display (HMD) 102. The client device 100 may execute the gaming application 110A locally on a processor (not shown). During execution, the logic of the gaming application 110A may make calls to a game engine 111A to perform one or more tasks for efficiency and speed. For example, the game engine 111A may perform in whole or in part one or more of the following, 2D or 3D graphics, physics simulation, collision detection, etc. In the case of physics simulation, the game engine 111A may emulate realistic or developer defined laws of physics to simulate forces acting on objects within the interactive gaming application. As another example, the game engine 111A may be tasked to generate the background environment of a scene, such as generating trees, etc.

The client device 100 may further include a local rule module 112A configured to apply certain game rules particular to one or more game titles. In particular, the local rules module may include a trophy module configured to detect an end game state corresponding to award of a trophy from gameplay information. Such gameplay information may be generated by the game engine 111A or may be previously-recorded gameplay information. According to aspects of the present disclosure, the client device may further include a data capture module 115A configured to extract metadata relating to a structure of the end game state from gameplay information associated with award of the trophy and a metric module 116A configured to determine metrics for the end game state from the metadata. In some implementations, the trophy module 112A may be configured to In some implementations, the gaming application 110A, or portions thereof, may be executed at a back-end processor operating at a back-end game server of a cloud game network or cloud gaming server system 151. For example, the cloud gaming server system 151 may include a plurality of virtual machines (VMs) running on a hypervisor of a host machine, with one or more virtual machines configured to execute a gaming application utilizing the hardware resources available to the hypervisor of the host in support of single player or multi-player video games. In that case, the client device 100 may be configured to request access to a gaming application 110B over a network 150, such as the internet, and for rendering instances of video games or gaming applications executed by a processor at the cloud gaming server system 151 and delivering the rendered instances (e.g., audio and video) to the display device 12 and/or HMD 102 associated with the player 5. For example, the player 5 may interact through client device 100 with an instance of a gaming application executing on cloud gaming server system 151. During execution, the logic of the interactive gaming application 110B may make calls to a server game engine 111B to perform one or more tasks for efficiency and speed. The gaming application 110B may also make calls to a local rule (e.g., trophy) module 112B, data capture module 115B, metric module 116B, and recording module 120B located on the gamer server system 151.

In some implementations, the client device 100 may operate in a single-player mode for a corresponding player that is playing a gaming application. In other implementations, the cloud gaming server system 151 may be configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment. For example, using state sharing data and multi-player logic objects and characters may be overlaid or inserted into each of the gaming environments of the users participating in the multi-player gaming session. For example, a character of a first user is overlaid or inserted into the gaming environment of a second user. This allows for interaction between users in the multi-player gaming session via each of their respective gaming environments (e.g., as displayed on a screen).

Whether the application is executing locally at client device 100, or at the back-end cloud gaming server system 151, the client device 100 may receive input from various types of input devices, such as game controllers 6, keyboards (not shown), gestures captured by video cameras, mice, touch pads, etc. Client device 100 can be any type of computing device having at least a memory and a processor module that is capable of connecting to the back-end server system 151 over network 150. Some examples of client device 100 include a personal computer (PC), a game console, a home theater device, a general-purpose computer, mobile computing device, a tablet, a phone, a thin client device, or any other types of computing devices. Client device 100 is configured to receive and/or generate rendered images, and to display the rendered images on a display 12, or alternatively on a head mounted display (HMD) 102. For example, the rendered images may be generated by the client interactive gaming application 110A as executed by the client device 100 in response to input commands that are used to drive game play of player 5, or the rendered images may be generated by the server interactive gaming application 110B as executed by the cloud gaming server system 151 in response to input commands used to drive game play of player 5. In embodiments, the HMD 102 can be configured to perform the functions of the client device 100.

The client device 100 may also include a data capture module 115A that is configured extract relevant data from structured or unstructured gameplay information. In particular, the data capture module may be configured to extract metadata relating to the structure of an end game state from gameplay information associated with award of the trophy. The client device 100 may further include a metric module configured to determining metrics for the end game state from the metadata.

In some implementations, the data capture module 115A may interact with the cloud gaming server system 151 to capture information related to the game play of player 5. For example, the captured information may include game context data (e.g., low level OS contexts) of the game play of user 5 when playing a gaming application, and global context information.

Each game context includes information (e.g., game state, user information, etc.) related to the game play, and may include low level OS information related to hardware operations (e.g., buttons actuated, speed of actuation, time of game play, etc.). More particularly, a processor of client device 100 executing the gaming application 110A is configured to generate and/or receive game and/or OS level context of the game play of user 5 when playing the gaming application. In addition, global context data is also collected, and related generally to user profile data (e.g., how long the player plays a gaming application, when the last time the player played a gaming application, how often the player requests assistance, how skilled the player is compared to other players, etc.). In one implementation, game contexts including OS level contexts and global contexts may be generated by the local game execution engine 111A on client device 100, outputted and delivered over network 150 to server-side game engine 111B, as managed through a data manager 155. In addition, game contexts including OS level contexts and global contexts may be generated by could gaming server system 151 when executing the server gaming application 110B, and stored in database 140 as managed by the data manager 155. Game contexts including OS level contexts and global contexts may be locally stored on client device 100 and/or stored at the within database 140.

In particular, each game context includes metadata and/or information related to the game play. Game contexts may be captured at various points in the progression of playing the gaming application, such as in the middle of a level. For illustration, game contexts may help determine where the player (e.g., character of the player) has been within the gaming application, where the player is in the gaming application, what the player has done, what assets and skills the player or the character has accumulated, what quests or tasks are presented to the player, and where the player will be going within the gaming application.

For example, game context also includes game state data that defines the state of the game at that point. For example, game state data may include game characters, game objects, game object attributes, game attributes, game object state, graphic overlays, location of a character within a gaming world of the game play of the player 5, the scene or gaming environment of the game play, the level of the gaming application, the assets of the character (e.g., weapons, tools, bombs, etc.), the type or race of the character (e.g., wizard, soldier, etc.), the current quest and/or task presented to the player, loadout, skills set of the character, game level, character attributes, character location, number of lives left, the total possible number of lives available, armor, trophy, time counter values, and other asset information, etc. Game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may include low level OS data, such as buttons actuated, speed of actuation, which gaming application was played, and other hardware related data. Game state data may also identify which parts of the executable code need to be loaded to execute the video game from that point. The game state data is stored in a game state database 145.

Also, game context may include user and/or player information related to the player. Generally, user/player saved data includes information that personalizes the video game for the corresponding player. This includes information associated with the player's character, so that the video game is rendered with a character that may be unique to that player (e.g., shape, race, look, clothing, weaponry, etc.). In that manner, the user/player saved data enables generation of a character for the game play of a corresponding player, wherein the character has a state that corresponds to the point in the gaming application experienced currently by a corresponding user and associated with the game context. In addition, user/player saved data may include the skill or ability of the player, recency of playing the interactive gaming application by the player, game difficulty selected by the player 5 when playing the game, game level, character attributes, character location, number of lives left, the total possible number of lives available, armor, trophy, time counter values, and other asset information, etc. User and/or player information may be stored in player saved database 141 of database 140. Other user/player may also include user profile data that identifies a corresponding player (e.g., player 5), which is stored in database 143.

In addition, the game play of player 5 may be recorded for later access. The game play may be captured locally by the recording module 120A, or captured at the back-end at the game play recorder 120B. Capture of the recording module 120A or 120B (e.g., at back-end) may be performed whether the execution of the gaming application is performed at the client device 100, or at the back-end cloud gaming server system 151. Game play recordings may be stored in a database 147.

In addition, the client device 100 may include a live capture device 125 that is configured to capture the responses and/or reactions of the player 5 while playing the gaming application. These responses and/or reactions may be used for further analysis (e.g., to determine events or events of dramatic significance), and also may be used for inclusion within a media package showcasing one or more game plays for streaming to other viewers upon demand. These responses and/or reactions may also be stored at the client device 100, or at the database 140 for later access.

The database system 140 may include a trophy database 142 containing files corresponding to teach trophy for a given game or for all trophies for different games. The database system may further include a dramatization database 149 that includes corresponding dramatization data 4 for each trophy. By way of example, the trophy database may store the trophy image data 2 and trophy text data 3. The dramatization data 4 may be associated with the trophy image data 2 and trophy text data 3, e.g., as pointers to file locations in a trophy data base 142. These pointers may be stored in a file containing the trophy data 1.

In some implementations, a back-end server, such as the cloud gaming server system 151, may be configured to provide dramatization of video gaming, including the surfacing of information (e.g., context related facts and statistics) during game play of a gaming application, and/or the packaging of two or more recordings of game plays of a gaming application in a media package that is edited to provide a story that is compelling to its viewers. In particular, the cloud gaming server system 151 may include a drama engine 160 configured to use the metrics for the end game state to generate commentary data corresponding to commentary on the award of the trophy. The drama engine 160 may be configured to provide the dramatization of video gaming with cooperation of artificial intelligence (AI) server 170. Drama engine 160 provides the dramatization of video gaming, including the surfacing of information (e.g., context related facts and statistics) during game play of a gaming application, and/or the packaging of two or more recordings of game plays of a gaming application in a media package that is edited to provide a story that is compelling to its viewers.

In particular, the metadata and information for the game context of the game play of player 5, as well as historical game contexts of other players playing the same gaming application, may be analyzed to generate relevant information (e.g., facts, statistics, etc.) that provide dramatization of the game play of player 5, or other game plays of other players. The analysis of the game contexts is performed through deep learning, such as by deep learning engine 190 of AI server 170. In particular, AI server 170 may include an event classification modeler 171 that builds and generates models of events occurring within a gaming application. The AI server 170 may include a deep learning engine 190 that is trained to build and generate models of events, and can be used for matching data to one or more models of events. In one embodiment, the models are for events of dramatic significance, e.g., a last second win, come from behind victory, a personal record, a universal record, etc. The event identifier 172 is configured to identify and/or match events occurring within a game play of player 5 or another player to a modeled event to understand the context of the game play with the cooperation of the deep learning engine 190. An event or batch of events may indicate that the game play is reaching a climax, and that the game play may break a record (e.g., personal, universal, etc.). Further, the event of dramatic significance identifier 173 is configured to identify and/or match one or more events occurring within the game play of player 5 or another player to a modeled event of dramatic significance with the help of the deep learning engine 190. In that manner, it may be determined whether a player may be approaching a significant event in his or her game play including or in addition to winning a trophy. For example, dramatic significant events may be a player reaching a personal record, a universal record, doing something new or rare, accomplishing a difficult task or challenge, overcoming a personal or universal negative trend, achieving a personal or universal positive trend, etc. Further, a story template comparator 175 is configured to identify and/or match a sequence of events within one or more game plays of one or more players to a story template for purposes of building a media package including the game plays. For example, a media package may include two game play recordings that were performed asynchronously but were identified and/or matched to tell a story following a story template. Story templates may define sports dramas, such as the underdog, the come-from-behind win, the blow-for-blow performance between two game plays, the photo finish, the Hail Mary pass to win the game, the single-player record, the multi-player record, the agony of defeat, the rookie who wins the game, the veteran down on his luck who wins the game, etc.

By way of example, in an automobile race game in which a race takes place at Laguna raceway a rookie racer named "Jacquie Steward" comes from behind on the last lap to take the checkered flag from a racer named "Smith" by half a car after skipping her last pit stop. The drama engine 160 may generate a prompt for the announcer commentary for this scenario as "Jacquie Steward comes from behind on the last lap to take the checkered flag from Smith by half a car at Laguna after skipping her last pit stop." The AI server 171 may generate the following commentary from this prompt as follows:

Ladies and gentlemen, it's an electrifying day here at Laguna Seka as we witness a spectacular showdown on this iconic track. We've got a thrilling race unfolding, and it's a true nail-biter!

As the cars scream down the straightaway, the crowd is on the edge of their seats. The atmosphere is charged with anticipation, and every corner holds the promise of drama. The drivers have pushed their machines to the limits, showcasing incredible skill and determination.

But wait! Who's that in the back of the pack? It's rookie racer Jacquie Steward! She's been lurking behind, keeping a low profile throughout the race. As the final lap begins, Steward unleashes her full potential, making a daring move. She skipped her last pit stop, gambling on the fuel in her tank and the tires that have served her well. It's a bold move that could either make or break her chances.

The crowd erupts as Steward slices through the field, overtaking one car after another. Her driving is nothing short of poetry in motion, navigating the hairpin turns and sweeping bends with unmatched finesse.

Steward refuses to yield and is closing the gap on the leader, Smith. The crowd roars, urging her forward.

And there it is! With a burst of speed, Steward crosses the finish line half a car in front of Smith! The crowd explodes with thunderous applause and cheers that reverberate through the grandstands. What a remarkable display of skill and strategy!

Jacquie Steward has etched her name in the annals of racing history. She defied the odds, overcame the challenges, and emerged victorious in the most breathtaking fashion.

This race will be remembered as a classic, a legendary moment etched in the hearts of every motorsport fan.

The aforementioned announcer's commentary may be synthesized as speech data and stored as part of an audio file that can be played over the audio system of the player's device. The audio file and associated video of the race may be associated with the audio data 4C corresponding to the trophy 1 awarded to the player for winning the race, e.g., as shown in FIG. 1A. In some implementations, the client-side trophy module 112A or server-side trophy module 112B may allow the player 5 to edit either the prompt or the text of the announcer's commentary and then synthesize or re-synthesize the audio data 4C.

FIG. 2 illustrates an example neural network used for dramatizing one or more game plays of one or more players, including the surfacing context related facts and statistics during game play of a gaming application, and/or for packaging of two or more recordings of game plays of a gaming application in a media package that is edited to provide a story that is compelling to its viewers, in accordance with one embodiment of the present disclosure. Specifically, the deep learning or machine learning engine 190 in the AI server 170 is configured as input to receive information related to game plays of one or more players playing a gaming application, for example. The deep learning engine 190 utilizes artificial intelligence, including deep learning algorithms, reinforcement learning, or other artificial intelligence-based algorithms to build the event models, event of dramatic significance models, story template models, etc. For example, during a learning and/or modeling phase, input data is used by the deep learning engine 190 to create event models that can be used for the dramatization of one or more game plays of one or more players.

In particular, neural network 190 represents an example of an automated analysis tool for analyzing data sets to determine the events performed during a gaming application, such as an event of dramatic significance, or events occurring during the normal game play of an application. Different types of neural networks 190 are possible. By way of example, the neural network 190 may support deep learning. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data representative of events occurring during game plays of a gaming application. For example, the data may be collected from live game plays, or automated game plays performed through simulation.

At the highest hierarchical level, an output layer 193 exists. The output layer 193 includes a set of output nodes. An output node represents a decision (e.g., prediction) that relates to information of an event. As such, the output nodes may match an event occurring within a game play of a gaming application given a corresponding context to a particular modeled.

These results can be compared to predetermined and true results obtained from previous game plays in order to refine and/or modify the parameters used by the deep learning engine 190 to iteratively determine the appropriate event and event of dramatic significance models. That is, the nodes in the neural network 190 learn the parameters of the models that can be used to make such decisions when refining the parameters. In that manner, a given event may be associated with ever refined modeled events, and possibly to a new modeled event.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation f is applied to the input nodes through the hidden layer 192, in one implementation. In an example, the transformation f is non-linear. Different non-linear transformations f is available including, for instance, a linear rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use backpropagation algorithms to employ different optimization methods to learn model parameters (e.g., the weights for the interconnections between nodes in the hidden layers 192) that minimize the cost function. An example of such an optimization method is stochastic gradient descent.

By way of example and not by way of limitation, the training dataset for the neural network 190 can be from a same data domain. For instance, the neural network 190 is trained for learning the patterns and/or characteristics of similar queries based on a given set of inputs or input data. For example, the data domain includes queries related to a specific scene in a gaming application for a given gaming context. In another example, the training dataset is from different data domains to include input data other than a baseline. As such, the neural network 190 may recognize a query using other data domains, or may be configured to generate a response model for a given query based on those data domains.

By way of example, the data stored in the database system 140 or in one or more of its various subcomponents may be structured context or state information. As used herein, "structured context information" refers to information that is organized and formatted in a consistent and predefined manner, making it easier to process, analyze, and understand a game context or state. Structured information may be represented in a tabular format, where data is organized into rows and columns, with each column representing a specific attribute or variable, and each row representing an individual data instance or observation. Such structured information may include, e.g., the game title, current game level, current game task, time spent on current task or current level, number of previous attempts at current task by the player, current absolute or relative game world locations for player and non-player characters, current game world time, game objects in a player character's inventory, player ranking, and the like. In some implementations, data stored in the database may include unstructured data related to context or state, i.e., data that may be relevant to determining a state or context but is not organized according to a particular consistent and predefined manner. Examples of such unstructured gameplay data include raw or encoded video data, raw or encoded audio data, controller input data and the like. Unstructured data may also include text documents, images, audio files, videos, social media posts, and other forms of data that do not fit into a tabular structure. Aspects of the present disclosure include implementations in which structured state or context information may be derived from unstructured gameplay data, some examples of which are discussed below.

Figure 3:
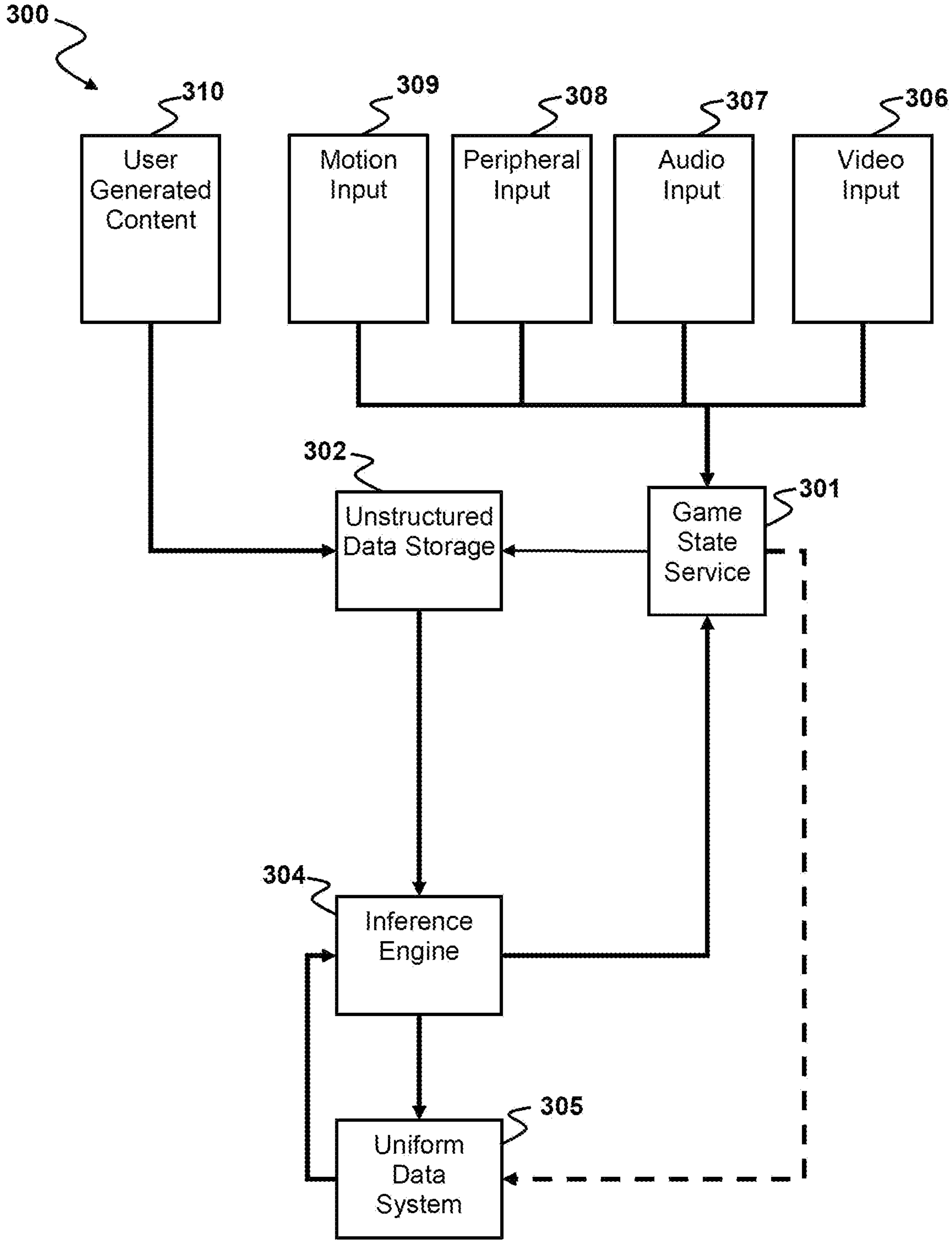
FIG. 3 is a diagram showing an example of a system for inferring structured context information from different sources of unstructured data according to aspects of the present disclosure.

FIG. 3 is a diagram showing an example of a system 300 for deriving structured context information from different sources of unstructured data according to aspects of the present disclosure. In the implementation shown the system 300 is executing an application that does not expose the application data structure to a uniform data system (UDS) 305. Instead, the inputs to the application such as peripheral input 308 and motion input 309 are interrogated by a game state service 301 and sent to unstructured data storage 302. The game state service 301 also interrogates unstructured application outputs such as video data 306 and audio data 307 and stores the data with unstructured data storage 302. Additionally, user generated content (UGC) 310 may be used as inputs and provided to the unstructured data storage 302. The game state service 301 may collect raw video data from the application which has not entered the rendering pipeline of the device. Additionally, the game state service 301 may also have access to stages of the rendering pipeline and as such may be able to pull game buffer or frame buffer data from different rendered layers which may allow for additional data filtering. Similarly raw audio data may be intercepted before it is converted to an analog signal for an output device or filtered by the device audio system.

The inference engine 304 receives unstructured data from the unstructured data storage 302 and predicts context information from the unstructured data. The context information predicted by the inference engine 304 may be formatted in the data model of the uniform data system. The inference engine 304 may also provide context data for the game state service 301 which may use the context data to pre-categorize data from the inputs based on the predicted context data. The information from the inference engine 304 can be used to store useful information, such as whether an audio clip includes a theme song or a current image is a daytime image). This stored information can then be used by a game state service 301 to categorize new data, e.g., in the form of a lookup or closeness similarity. For example, if the inference engine finds that a piece of audio data is a theme song the game state service 301 could simply provide this piece with the contextual label whenever it appears in the unstructured data. In some implementations, the game state service 301 may provide game context updates at update points or at game context update interval to the UDS 305. These game context updates may be provided by the UDS 305 to the inference engine 304 and used as base data points that are updated by context data generated by the inference engine. In some implementations the inference engine 304 may include optical character recognition components which may convert text from the screen that is not machine readable to machine readable form. The inference engine may then analyze the resulting machine-readable text using a suitably configured text analysis neural network to extract relevant context information. Furthermore, the inference engine may include an object recognition component, e.g., a neural network trained to recognize specific objects that are relevant to context. Such objects may include characters, locations, vehicles, and structures.

The context information may then be provided to the UDS 305. The UDS service 305 may also provide structured information to the inference engine 304 to aid in the generation of context data. The data capture module 24 may access context information stored in the UDS 305 to extract metadata relating to the structure of the end game state associated with award of the trophy 1. Furthermore, the drama module 28 may access context information in the UDS to generate dramatization data 4 for enhancement of the trophy 1. The various components of the AI server 170, e.g., event classification modeler 171, event identifier 172, significant event identifier 173, and story template comparator 175, may also access the context information in the UDS 305.

By way of example, the peripheral input 308 may include a sequence of button presses. Each button press may have a unique value which differentiates each of the buttons. The inference engine may include a neural network trained to recognize certain specific sequences of button presses as corresponding to a specific command. While the above discusses button presses it should be understood that aspects of the present disclosure are not so limited and the button presses recognized by the sequence recognition module may include joystick movement directions, motion control movements, touch screen inputs, touch pad inputs and similar.

By way of example, the motional control input 309 may include inputs from one or more inertial measurement units (IMUs). By way of example, the IMUs may include one or more accelerometers and/or gyroscopes located in a game controller or 6 or HMD 102. In such implementations the inference engine 304 may include one or more neural networks configured to classify unlabeled motion inputs from the IMU. The motion control neural networks may be trained to differentiate between motion inputs from the HUD, the game controller and other motion devices or alternatively a separate motion control classification module may be used for each motion input device (e.g., controller, left VR foot controller, right VR foot controller, left VR hand controller, right VR hand controller, HMD etc.) in the system. The output of the IMUs may be a time series of accelerations and angular velocities which may be processed to correspond to movements of the controller or HMD with respect to X, Y, and Z axes. The motion control classification neural networks in the inference engine 304 may be trained to classify changes in angular velocity of the HMD as simple movements such as looking left or right.

Figure 4:
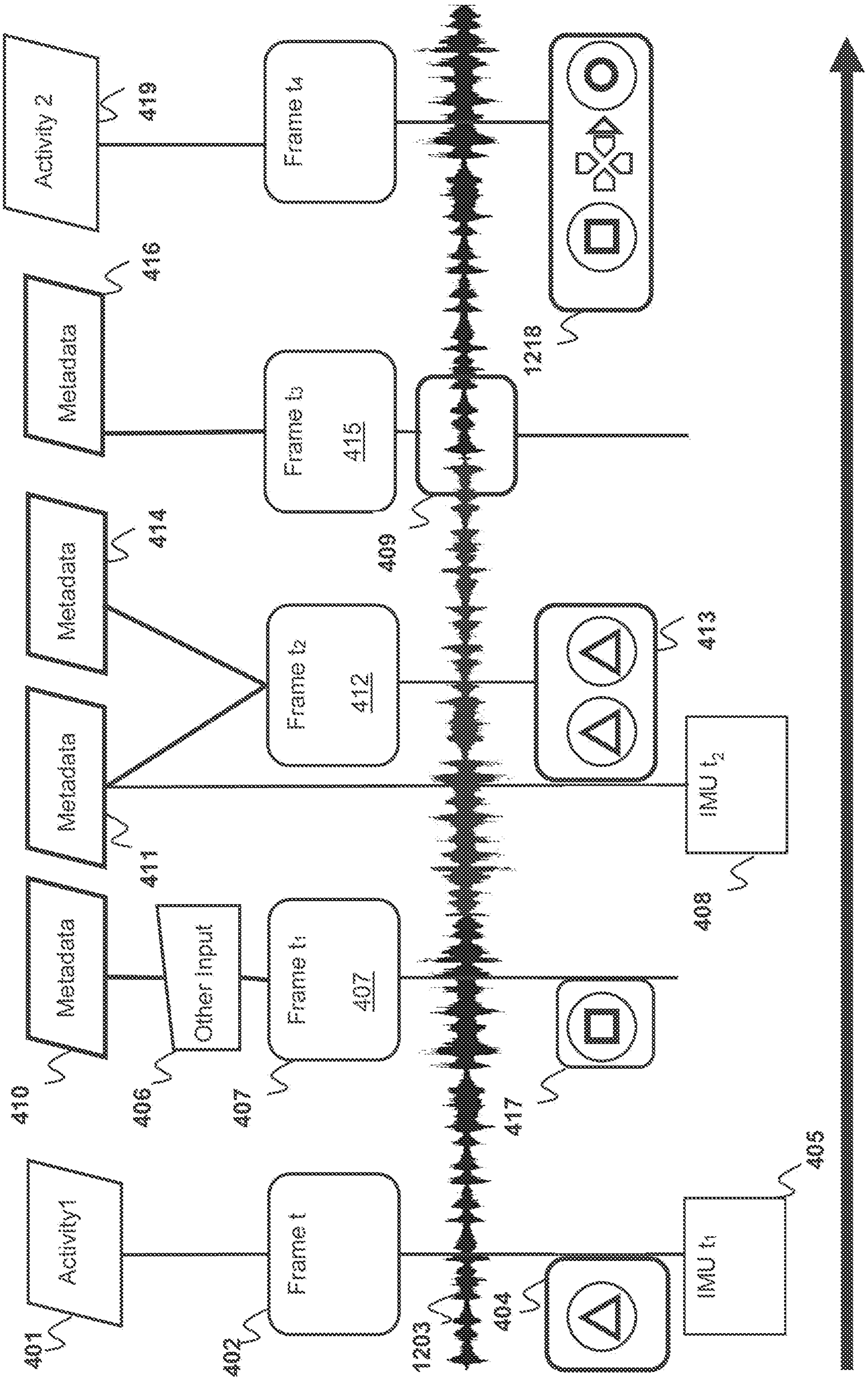
FIG. 4 is a diagram depicting an example of recognition of input events using correlation of unlabeled inputs with an inference engine according to aspects of the present disclosure.

FIG. 4 is a diagram depicting an example of recognition of input events using correlation of unlabeled inputs with an inference engine according to aspects of the present disclosure. In some implementations multimodal data processing may be used to further confirm predictions made by the inference engine. This can reduce processing time if a prediction in one data modality results in avoiding additional processing. As shown the inference engine may receive inputs from multiple modalities, including video/image frames 402, audio data 403, peripheral (e.g., game controller or HMD) inputs 404, and motion data 405. The system may generate context information that includes activities 401 and metadata 410. The multi-modal fusion of different types of inputs allows for the discovery of correlated inputs which may provide enhanced functionality and a reduction in processing because less processing intensive indicators of events may be discovered. For example, and without limitation, during training the system may be configured to recognize that a certain sound indicates 409 that player has fired an arrow as such the screen data 415 for the ammo count no longer needs to be processed because the system can wait for the sound and keep a count 416 of the number of arrows shot. In another example shown the system may identify motion data 408 indicating player motion and, as such, an image frame of the screen 412 does not need to be examined to determine the direction a player in a game is facing 411. In addition, the system may implement an ensemble model that can perform say the arrow count through both audio analysis as discussed above and image analysis to strengthen the arrow count prediction.

In some implementations the inference engine may generate an internal game state representation that is updated with UDS data each time the multi-modal neural networks generated a classification. The inference engine may also use peripheral input to correlate game state changes for example a series of triangle button presses 413 may be identified as corresponding to performing a dash attack. As such, image frames 412 do not need to be classified to determine the activation of a dash attack and if the dash attack has a movement component player location does not need to be determined. Instead, the inference engine may simply update the context information 414 with information corresponding to the dash attack. In another example, other input information 406 may be used to determine game context information 410 for example and without limitation the user may save a screenshot and upload it to social media 406, the inference engine may correlate this to pausing the game and the inference engine may not have to classify peripheral inputs 417 or image frames 407 of the game screen 407 to determine that the game is paused and update the game context 410. Finally, the inference engine may identify certain peripheral input sequences 418 that correspond to certain menu actions and update the activities 419 based on the internal game state representation. For example, and without limitation, the trained inference engine may determine that the peripheral input sequence 418 circle, right arrow, square, corresponds to opening up a quest menu and selecting the next quest in a quest list. Thus, the activity 419 may be updated by simply changing an internal representation of the game state to the next quest based on the identified input sequence. These are just some examples of the time coincident correlations that may be discovered and use of indirect prediction of game context by the inference engine.

Additionally, the inference engine may retain an internal game state and update the internal game state with each received and classified input. In some implementations the inference engine may receive game state updates from the UDS periodically or at an update interval. These game state updates may be generated by the game and sent periodically or at an interval to the UDS. The game state updates may be used by the inference engine to build the internal game state and update the internal game state. For example, at the start of an Activity 401 the activity data may be provided by the game to the UDS with initial meta data for the game state. While playing the game may not provide updates to the UDS and the inference engine may update the game state with metadata 410, 411, 414, 416 until the next game state update 419. The game state update 401, 419 may reduce the amount of processing required because it may contain information that the inference engine can use to selectively disable modules. For example, the game context update may provide metadata that indicate that the game takes place in the Old West and does not contain any motorized vehicles as such modules trained for recognition of certain motorized vehicle sounds or motorized vehicle objects may be turned off. This saves processing power as the image and sound data does not need to be analyzed by those modules.

Figure 5:
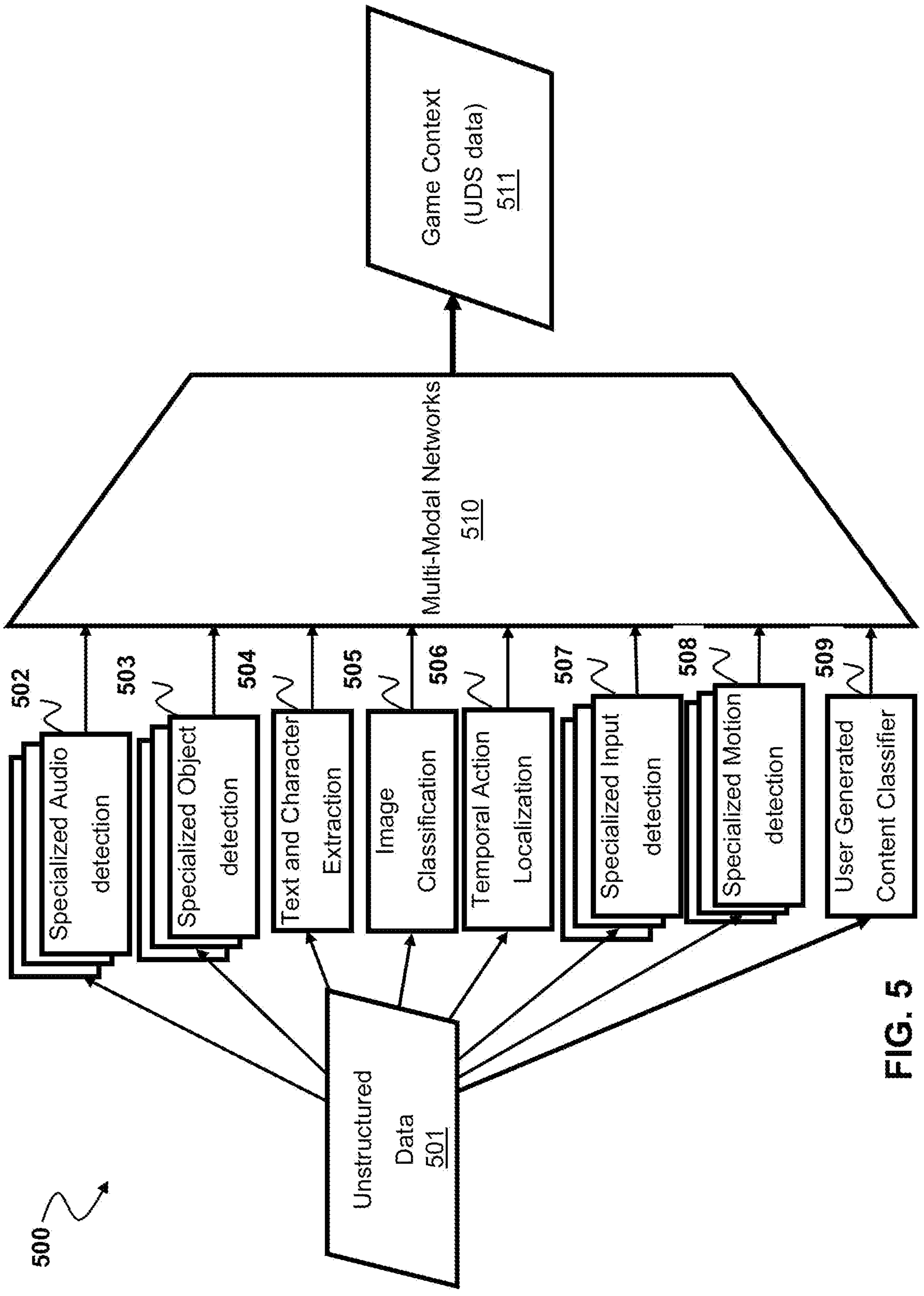
FIG. 5 is a diagram depicting an example layout of modal modules in a multi-modal recognition network of the inference engine according to aspects of the present disclosure.

FIG. 5 is a diagram depicting an example layout of unimodal modules in a multi-modal recognition network of the inference engine according to aspects of the present disclosure. As shown the inference engine includes one or more unimodal modules operating on different modalities of input information and a multi-modal module which receives information from the unimodal modules. In the implementation shown the inference engine 500 includes the unimodal modules of; one or more audio detection modules 502, one or more object detection modules 503, a text and character extraction module 504, an image classification module 505, temporal action localization module 506, one or more input detection modules 507, one or more motion detection modules 508, and a user generated content classifier 509. The inference engine also includes a multimodal neural network module which takes the outputs of the unimodal modules and generates context information 511 in the UDS format.

Audio Detection Modules

The one or more audio detection modules 502 may include one or more neural networks trained to classify audio data. Additionally, the one or more audio detection modules may include audio pre-processing stages and feature extraction stages. The audio preprocessing stage may be configured to condition the audio for classification by one or more neural networks.

Pre-processing may be optional because audio data is received directly from the unstructured data 501 and therefore would not need to be sampled and would ideally be free from noise. Nevertheless, the audio may be preprocessed to normalize signal amplitude and adjust for noise.

The feature extraction stage may generate audio features from the audio data to capture feature information from the audio. The feature extraction stage may apply transform filters to the pre-processed audio based on human auditory features such as for example and without limitation Mel Frequency cepstral coefficients (MFCCs) or based Spectral Feature of the audio for example short time Fourier transform. MFCC may provide a good filter selection for speech because human hearing is generally tuned for speech recognition additionally because most applications are designed for human use the audio may be configured for the human auditory system. Short Fourier Transform may provide more information about sounds outside the human auditory range and may be able to capture features of the audio lost with MFCC.

The extracted features are then passed to one or more of the audio classifiers. The one or more audio classifiers may be neural networks trained with a machine learning algorithm to classify events from the extracted features. The events may be game events such as gun shots, player death sounds, enemy death sounds, menu sounds, player movement sounds, enemy movement sounds, pause screen sounds, vehicle sounds, or voice sounds. In some implementations the audio detection module may speech recognition to convert speech into a machine-readable form and classify key words or sentences from the text. In some alternative implementations text generated by speech recognition may be passed to the text and character extraction module for further processing. According to some aspects of the present disclosure the classifier neural networks may be specialized to detect a single type of event from the audio. For example, and without limitation, there may be a classifier neural network trained to only classify features corresponding to weapon shot sounds and there may be another classifier neural network to recognize vehicle sounds. As such for each event type there may be a different specialized classifier neural network trained to classify the event from feature data. Alternatively, a single general classifier neural network may be trained to classify every event from feature data. Or in yet other alternative implementations a combination of specialized classifier neural network and generalized classifier neural networks may be used. In some implementations the classifier neural networks may be application specific and trained off a data set that includes labeled audio samples from the application. In other implementations the classifier neural network may be a universal audio classifier trained to recognize events from a data set that includes labeled common audio samples. Many applications have common audio samples that are shared or slightly manipulated and therefore may be detected by a universal audio classifier. In yet other implementations a combination of universal and application specific audio classifier neural networks may be used. In either case the audio classification neural networks may be trained de novo or alternatively may be further trained from pre-trained models using transfer learning. Pre-trained models for transfer learning may include without limitation VGGish, Sound net, Resnet, Mobilenet. Note that for Resnet and Mobilenet the audio would be converted to spectrograms before classification.

In training the audio classifier neural networks, whether de novo or from a pre-trained module, the audio classifier neural networks may be provided with a dataset of game play audio. The dataset of gameplay audio used during training has known labels. The known labels of the data set are masked from the neural network at the time when the audio classifier neural network makes a prediction, and the labeled gameplay data set is used to train the audio classifier neural network with the machine learning algorithm after it has made a prediction as is discussed in the generalized neural network training section. In some implementations the universal neural network may also be trained with other datasets having known labels such as for example and without limitation real world sounds, movie sounds or You Tube video.

Object Detection Modules

The one or more object detection modules 503 may include one or more neural networks trained to classify objects occurring within an image frame of video or an image frame of a still image. Additionally, the one or more object detection modules may include a frame extraction stage, an object localization stage, and an object tracking stage.

The frame extraction stage may simply take image frame data directly from the unstructured data. In some implementations the frame rate of video data may be down sampled to reduce the data load on the system. Additionally in some implementations the frame extraction stage may only extract key frames or I-frames if the video is compressed. In other implementations, only a subset of the available channels of the video may be analyzed. For example, it may be sufficient to analyze only the luminance (brightness) channel of the video but not the chrominance (color) channel. Access to the full unstructured data also allows frame extraction to discard or use certain rendering layers of video. For example, and without limitation, the frame extraction stage may extract the UI layer without other video layers for detection of UI objects or may extract non-UI rendering layers for object detection within a scene.

The object localization stage identifies features within the image. The object localization stage may use algorithms such as edge detection or regional proposal. Alternatively, the neural network may include deep learning layers that are trained to identify features within the image may be utilized.

The one or more object classification neural networks are trained to localize and classify objects from the identified features. The one or more classification neural networks may be part of a larger deep learning collection of networks within the object detection module. The classification neural networks may also include non-neural network components that perform traditional computer vision tasks such as template matching based on the features. The objects that the one or more classification neural networks are trained to localize and classify includes for example and without limitation, Game icons such as; player map indicator, map location indictor (Points of interest); item icons, status indicators, menu indicators, save indicators, and character buff indicators, UI elements such as health level, mana level, stamina level, rage level, quick inventory slot indicators, damage location indicators, UI compass indicators, lap time indicators, vehicle speed indicators, and hot bar command indicators, application elements such as weapons, shields, armors, enemies, vehicles, animals, trees, and other interactable elements.

According to some aspects of the present disclosure the one or more object classifier neural networks may be specialized to detect a single type of object from the features. For example, and without limitation, there may be object classifier neural network trained to only classify features corresponding to weapons and there may be another classifier neural network to recognize vehicles. As such for each object type there may be a different specialized classifier neural network trained to classify the object from feature data. Alternatively, a single general classifier neural network may be trained to classify every object from feature data. Or in yet other alternative implementations a combination of specialized classifier neural network and generalized classifier neural networks may be used. In some implementations the object classifier neural networks may be application specific and trained off a data set that includes label audio samples from the application. In other implementations the classifier neural network may be a universal object classifier trained to recognize objects from a data set that includes labeled frames containing common objects. Many applications have common objects that are shared or slightly manipulated and therefore may be detected by a universal object classifier. In yet other implementations a combination of universal and application specific object classifier neural networks may be used. In either case the object classification neural networks may be trained de novo or alternatively may be further trained from pre-trained models using transfer learning. Pre-trained models for transfer learning may include without limitation Faster R-CNN (Region-based convolutional neural network), YOLO (You only look once), SSD (Single shot detector), and Retinanet.

Frames from the application may be still images or may be part of a continuous video stream. If the frames are part of a continuous video stream the object tracking stage may be applied to subsequent frames to maintain consistency of the classification over time. The object tracking stage may apply known object tracking algorithms to associate a classified object in a first frame with an object in a second frame based on for example and without limitation the spatial temporal relation of the object in the second frame to the first and pixel values of the object in the first and second frame.

In training the object detection neural networks, whether de novo or from a pre-trained model, the object detection classifier neural networks may be provided with a dataset of game play video. The dataset of gameplay video used during training has known labels. The known labels of the data set are masked from the neural network at the time when the object classifier neural network makes a prediction, and the labeled gameplay data set is used to train the object classifier neural network with the machine learning algorithm after it has made a prediction as is discussed in the generalized neural network training section. In some implementations the universal neural network may also be trained with other datasets having known labels such as for example and without limitation real world images of objects, movies or YouTube video.

Text and Character Extraction

Text and character extraction are similar tasks to object recognition but it is simpler and the scope is narrower. The text and character extraction module 504 may include a video preprocessing component, text detection component and text recognition component.

The video preprocessing component may modify the frames or portions of frames to improve recognition of text. For example, and without limitation, the frames may be modified by preprocessing de-blurring, de-noising and contrast enhancement.

Text detection components are applied to frames and configured to identify regions that contain text. Computer vision techniques such as edge detection and connected component analysis may be used by the text detection components. Alternatively, text detection may be performed by a deep learning neural network trained to identify regions containing text.

Low level Text recognition may be performed by optical character recognition. The recognized characters may be assembled into words and sentences. Higher level text recognition provides assembled words and sentences with context. A dictionary may be used to look up and tag contextually important words and sentences. Alternatively, a neural network may be trained with a machine learning algorithm to classify contextually important words and sentences. For example, and without limitation, the text recognition neural networks may be trained to recognize words for game weapons, armor, shields, trees, animals, vehicles, enemies, locations, landmarks, distances, times, dates, menu settings, items, questions, quests, and achievements. Similar to above, the text recognition neural network or dictionary may be universal and shared between applications or specialized for each application or a combination of the two.

In training the high-level text recognition neural networks may be trained de novo or using transfer learning from a pretrained neural network. Pretrained neural networks that may be used with transfer learning include for example and without limitation Generative Pretrained Transformer (GPT) 2, GPT 3, GPT 4, Universal Language Model Fine-Tuning (ULMFIT), Embeddings from Language Models (ELMo), Bidirectional Encoder Representations from Transformers (BERT) and similar. Whether de novo or from a pre-trained model, the high-level Text recognition neural networks may be provided with a dataset of gameplay text. The dataset of gameplay text used during training has known labels. The known labels of the data set are masked from the neural network at the time when the high-level text recognition neural network makes a prediction, and the labeled gameplay data set is used to train the high-level text recognition neural network with the machine learning algorithm after it has made a prediction as is discussed in the generalized neural network training section. In some implementations the universal neural network may also be trained with other datasets having known labels such as for example and without limitation real world images of text, books or websites.

Image Classification

The Image classification module 505 classifies the entire image of the screen whereas object detection decomposes elements occurring within the image frame. The task of image classification is similar to object detection except it occurs over the entire image frame without an object localization stage and with a different training set. An image classification neural network may be trained to classify contextually important image information from an entire image. Contextually important information generated from the entire image may be for example, whether the image scene is day or night, whether the image is a game inventory screen, menu screen, character screen, map screen, statistics screen, etc. Some examples of pre-trained image recognition models that can be used for transfer learning include, but are not limited to, VGG, ResNet, EfficientNet, DenseNet, MobileNet, VIT, GoogLeNet, Inception, and the like.

The image classification neural networks may be trained de novo or trained using transfer learning from a pretrained neural network. Whether de novo or from a pre-trained module, the image classification neural networks may be provided with a dataset of gameplay image frames. The dataset of gameplay image frames used during training has known labels. The known labels of the data set are masked from the neural network at the time when the image classification neural network makes a prediction, and the labeled gameplay data set is used to train the image classification neural network with the machine learning algorithm after it has made a prediction as is discussed in the generalized neural network training section. In some implementations the universal neural network may also be trained with other datasets having known labels such as for example and without limitation images of the real world, videos of gameplay or game replays.

Temporal Action Localization

Context information may include for example and without limitation, special moves, attacks, defense, and movements which are typically made up of a series of time localized movements within a series of image frames of a video. As such a temporal action localization module 506 may localize and classify movements occurring within the image frames of application data to generate movement context information.

The temporal action localization module may include a frame preprocessing component, feature extraction component, action proposal generation component, action classification component and Localization component.

The frame preprocessing component may take sequences of image frames as data directly from the unstructured data. Access to the full unstructured data also allows frame extraction to discard or use certain rendering layers of video. For example, frame preprocessing may extract non-UI rendering layers for object detection within a scene. Additionally, the preprocessing component may alter the image frames to improve detection for example and without limitation the frames may have their orientation and color normalized.

The feature extraction component may be a neural network component of the temporal localization module. The feature extraction component may have a series of convolutional layers and pooling neural network layers trained to extract low level and high-level features from video. The feature extraction component may be a pre-trained network, trained to extract low level and high-level features from image frames of a video without the need for further training. In some implementations, it may be desirable to train the feature extraction component from scratch.

The action proposal generation component breaks a sequence of image frames in the video into more processable space. In one implementation a sliding overlapping window may be used to extract features over each image frame in the sequence of images frame of the video data. In another implementation features may be taken from each image frame for a limited window of frames (i.e., a limited time period) in the video. Each window of frames may be overlapping in time as such this may be thought of as a sliding temporal window. In yet another implementation a non-overlapping window may be used.

The action classification component may include one or more neural networks trained to classify actions occurring within the window of extracted features provided by the action proposal component. The action classification component may include a different trained neural network for each of the different movements or movement types that are to be detected. The one or more action classification modules may be universal and shared between applications or may be specially trained for each application or a combination of both.

In training the action classification neural networks may be trained de novo or using transfer learning from a pre-trained neural network. Whether de novo or from a pre-trained module, the action classification neural networks may be provided with a dataset containing a sequence of gameplay image frames. The dataset of gameplay image frames used during training has known labels of actions. The known labels of the data set are masked from the neural network at the time when the action classification neural network makes a prediction, and the labeled gameplay data set is used to train the action classification neural network with the machine learning algorithm after it has made a prediction as is discussed in the generalized neural network training section. The specialized neural network may have a data set including only videos or gameplay or game replays of the specific application, this may create a neural network that is good at predicting actions for a single application. In some implementations the universal neural network may also be trained with other datasets having known labels such as for example and without limitation videos of actions across many applications, actual game play of many applications or game replays of many applications.

After classification, the classification of the action is passed to the localization component which combines the classified action with the segments that were classified. The resulting combined information is then passed as a feature to the multi-modal neural networks.

Input Detection

The unstructured dataset 501 may include inputs from peripheral devices. The input detection module 507 may take the inputs from the peripheral devices and identify the inputs. In some implementations the input detection module 507 may include a table containing commands for the application and output a label identifying the command when a matching input is detected. Alternatively, the input detection module may include one or more input classification neural networks trained to recognize commands from the peripheral inputs in the unstructured data. Some inputs are shared between applications for example and without limitation, many applications used a start button press for pausing the game and opening a menu screen and a select button press to open a different menu screen. Thus, according to some aspects of the present disclosure one or more of the input detection neural networks may be universal and shared between applications. In some implementations the one or more input classification neural networks may be specialized for each application and trained on a data set consisting of commands for the specific chosen application. In yet other implementations a combination of universal and specialized neural networks is used. Additionally in alternative implementations the input classification neural networks may be highly specific with a different trained neural network to identify each command for the context data. Context data may include commands that include for example and without limitation, pause commands, menu commands, movement commands, action commands, and selection commands.

The input classification neural networks may be provided with a dataset including peripheral inputs occurring during use of the computer system. The dataset of peripheral inputs used during training have known labels for commands. The known labels of the data set are masked from the neural network at the time when the input classification neural network makes a prediction, and the labeled data set of peripheral inputs is used to train the input classification neural network with the machine learning algorithm after it has made a prediction as is discussed in the generalized neural network training section. A specialized input classification neural network may have a data set that consists of recordings of inputs sequences that occur during operation of a specific application and no other applications; this may create a neural network that is good at predicting actions for a single application. In some implementations, a universal input classification neural network may also be trained with other datasets having known labels such as for example and without limitation input sequences across many different applications. In situations where available transfer learning models for processing peripheral inputs are limited or otherwise unsatisfactory, a "pre-trained" model may be developed that can process peripheral inputs for a particular game or other application. This pre-trained model may then be used for transfer learning for other games or applications.

Motion Detection

Many applications also include a motion component in the unstructured data 501 set that may provide commands which could be included in context information. The motion detection module 508 may take the motion information from the unstructured data 501 and turn the motion data into commands for the context information. A simple approach to motion detection may include simply providing different thresholds and outputting a command each time an element from an inertial measurement unit exceeds the threshold. For example, and without limitation, the system may include a 2-gravity acceleration threshold in the X axis to output a command that the headset is changing direction. Another alternative approach is neural network-based motion classification. In this implementation the motion detection module may include the components of motion preprocessing, feature selection and motion classification.

The motion preprocessing component conditions the motion data to remove artifacts and noise from the data. The preprocessing may include noise floor normalization, mean selection, standard deviation evaluation, Root means square torque measurement, and spectral entropy signal differentiation.

The feature selection component takes preprocessed data and analyzes the data for features. Selecting features using techniques for example and without limitation principal component analysis, correlational analysis, sequential forward selection, backwards elimination and mutual information.

Finally, the selected features are applied to the motion classification neural networks trained with a machine learning algorithm to classify commands from motion information. In some implementations the selected features are applied to other machine learning models which do not include a neural network for example and without limitation, decision trees, random forests, and support vector machines. Some inputs are shared between applications for example and without limitation, many applications selection commands are simple commands to move a cursor. Thus, according to some aspects of the present disclosure one or more of the motion classification neural networks may be universal and shared between applications. In some implementations the one or more motion classification neural networks may be specialized for each application and trained on a data set consisting of commands for the specific chosen application. In yet other implementation a combination of universal and specialized neural networks is used. Additionally in alternative implementations the motion classification neural networks may be highly specific with a different trained neural network to identify each command for the context data.

The motion classification neural networks may be provided with a dataset including motion inputs occurring during use of the computer system. The dataset of motion inputs used during training has known labels for commands. The known labels of the data set are masked from the neural network at the time when the motion classification neural network makes a prediction, and the labeled data set of motion inputs is used to train the motion classification neural network with the machine learning algorithm after it has made a prediction as is discussed in the generalized neural network training section. A specialized motion classification neural network may have a data set that consists of recordings of inputs sequences that occur during operation of a specific application and no other application; this may create a neural network that is good at predicting actions for a single application. In some implementations a universal motion classification neural network may also be trained with other datasets having known labels such as for example and without limitation input sequences across many different applications.

User Generated Content Classification

The system may also be configured to classify elements occurring within user generated content. As used herein user generated content may be data generated by the user on the system coincident with use of the application. For example, and without limitation, user generated content may include chat content, blog posts, social media posts, screen shots, user generated documents. The User Generated Content Classification module 509 may include component from other modules such as the text and character extraction module and the object detection module to place the user generated content in a form that may be used as context data. For example, and without limitation, the User Generated Content Classification may decompose text and character extraction components to identify contextually important statements made by the user in a chat room. As a specific, non-limiting example the user may make a statement in chat such as ‘pause’ or ‘bio break’ which may be detected and used as meta data indicating the user is paused, on a break or do not disturb. As another example, the User Generated Content Classification module 509 may identify moments the user chooses to grab a screenshot. Such moments are likely to be of significance to the user. Screen shots of such moments may be analyzed and classified with labels, e.g., “winning a trophy” or “setting a game record” and the labels may be used as a metadata.

Multi-Modal Networks

The multi-modal networks 510 fuse the information generated by the modules 502-509 and generates structured game context information 511 from the separate modal networks of the modules. In some implementations the data from the separate modules are concatenated together to form a single multi-modal vector. The multi-modal vector may also include unprocessed data from unstructured data.

The multi-modal neural networks 510 may be trained with a machine learning algorithm to take the multi-modal vector and generate structured Game context data in the form of UDS data 511. Training the multi-modal neural networks 510 may include end to end training of all of the modules with a data set that includes labels for multiple modalities of the input data. During training the labels of the multiple input modalities are masked from the multi-modal neural networks before prediction. The labeled data set of multi-modal inputs is used to train the multi-modal neural networks with the machine learning algorithm after it has made a prediction as is discussed in the generalized neural network training section.

The multi-modal neural networks 510 may include a neural network trained with a machine learning algorithm to determine one or more irrelevant modules from the structured application state data. During training the Context State update module may be trained with training data that has labels that are masked during training. The labeled training data may include structured application data that is labeled with one or more irrelevant modules.

Context state update neural network module predicts one or more modules that are irrelevant modules with the masked training data and then trained with the labeled training data. For further discussion on training see the general neural network training section above.

Generalized Neural Network Training

The NNs discussed above may include one or more of several different types of neural networks and may have many different layers. By way of example and not by way of limitation the neural network may consist of one or multiple convolutional neural networks (CNN), recurrent neural networks (RNN) and/or dynamic neural networks (DNN). The Motion Decision Neural Network may be trained using the general training method disclosed herein.

Figure 6A:
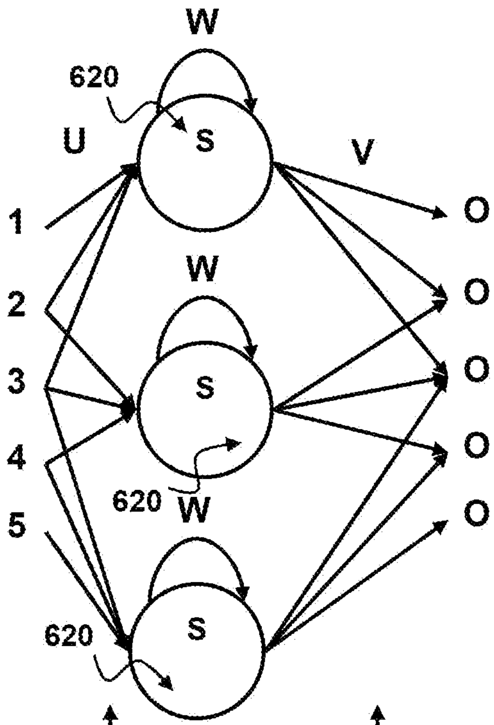
FIG. 6A is a simplified node diagram of a recurrent neural network according to aspects of the present disclosure.
Figure 6B:
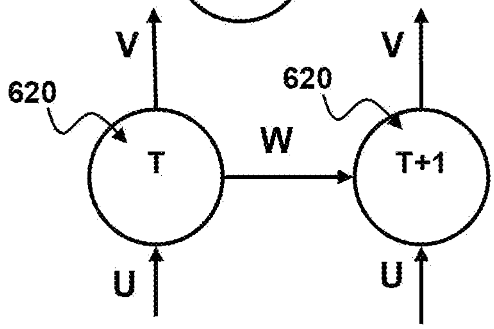
FIG. 6B is a simplified node diagram of an unfolded recurrent neural network according to aspects of the present disclosure.

By way of example, and not limitation, FIG. 6A depicts the basic form of an RNN that may be used, e.g., in the trained model. In the illustrated example, the RNN has a layer of nodes 620, each of which is characterized by an activation function S, one input weight U, a recurrent hidden node transition weight W, and an output transition weight V. The activation function S may be any non-linear function known in the art and is not limited to the (hyperbolic tangent (tan h) function. For example, the activation function S may be a Sigmoid or ReLu function. Unlike other types of neural networks, RNNs have one set of activation functions and weights for the entire layer. As shown in FIG. 6B, the RNN may be considered as a series of nodes 620 having the same activation function moving through time T and T+1. Thus, the RNN maintains historical information by feeding the result from a previous time T to a current time T+1.

In some implementations, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9 (8): 1735-1780 (1997), which is incorporated herein by reference.

Figure 6C:
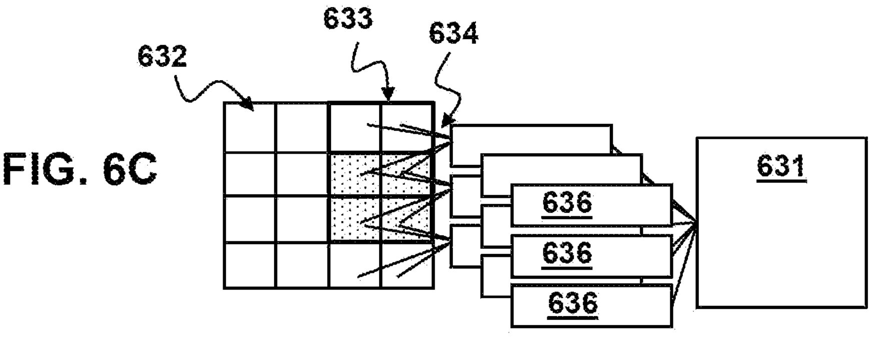
FIG. 6C is a simplified diagram of a convolutional neural network according to aspects of the present disclosure.

FIG. 6C depicts an example layout of a convolution neural network such as a CRNN, which may be used, e.g., in the trained model according to aspects of the present disclosure. In this depiction, the convolution neural network is generated for an input 632 with a size of 4 units in height and 4 units in width giving a total area of 16 units. The depicted convolutional neural network has a filter 633 size of 2 units in height and 2 units in width with a skip value of 1 and a channel 636 of size 9. For clarity in FIG. 6C only the connections 634 between the first column of channels and their filter windows is depicted. Aspects of the present disclosure, however, are not limited to such implementations. According to aspects of the present disclosure, the convolutional neural network may have any number of additional neural network node layers 631 and may include such layer types as additional convolutional layers, fully connected layers, pooling layers, max pooling layers, local contrast normalization layers, etc. of any size.

Figure 6D:
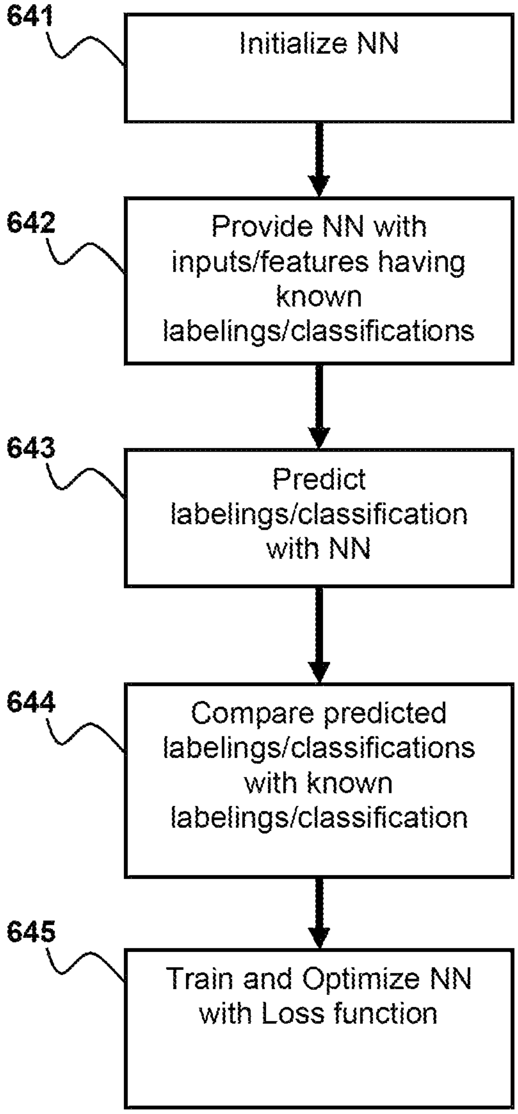
FIG. 6D is a block diagram of a method for training a neural network that is part of the multimodal processing according to aspects of the present disclosure.

As seen in FIG. 6D Training a neural network (NN) begins with initialization of the weights of the NN at 1541. In general, the initial weights should be distributed randomly. For example, an NN with a tan h activation function should have random values distributed between $$-\frac{1}{\sqrt{n}} \text{ and } \frac{1}{\sqrt{n}}$$

where n is the number of inputs to the node.

After initialization, the activation function and optimizer are defined. The NN is then provided with a feature vector or input dataset at 642. Each of the different feature's vectors that are generated with a unimodal NN may be provided with inputs that have known labels. Similarly, the multimodal NN may be provided with feature vectors that correspond to inputs having known labeling or classification. The NN then predicts a label or classification for the feature or input at 643. The predicted label or class is compared to the known label or class (also known as ground truth) and a loss function measures the total error between the predictions and ground truth over all the training samples at 644. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function and using known methods of training for neural networks such as backpropagation with adaptive gradient descent etc., as indicated at 645. In each training epoch, the optimizer tries to choose the model parameters (i.e., weights) that minimize the training loss function (i.e., total error). Data is partitioned into training, validation, and test samples.

During training, the Optimizer minimizes the loss function on the training samples. After each training epoch, the model is evaluated on the validation sample by computing the validation loss and accuracy. If there is no significant change, training can be stopped, and the resulting trained model may be used to predict the labels of the test data.

Thus, the neural network may be trained from inputs having known labels or classifications to identify and classify those inputs. Similarly, a NN may be trained using the described method to generate a feature vector from inputs having a known label or classification. While the above discussion is relation to RNNs and CRNNS the discussions may be applied to NNs that do not include Recurrent or hidden layers.

While specific embodiments have been provided to demonstrate leveraging of artificial intelligence to generate commentary that can enhance a video game trophy in original and creative ways, these are described by way of example and not by way of limitation. Those skilled in the art having read the present disclosure will realize additional embodiments falling within the spirit and scope of the present disclosure.

It should be noted, that access services, such as providing access to enhanced video game trophies of the present disclosure, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Aspects of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some implementations, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various implementations described herein may be executed on any type of client device. In some embodiments, the client device is a head mounted display (HMD), or projection system.

While specific embodiments have been provided to demonstrate the enhancement of trophies associated with game play of a gaming application, and/or for packaging commentary data with trophy data to provide an enhanced trophy that is compelling to its viewers, these are described by way of example and not by way of limitation. Those skilled in the art having read the present disclosure will realize additional embodiments falling within the spirit and scope of the present disclosure. For example, certain implementations described herein involve enhanced skills-based trophies for a single player in games such as racing games. Aspects of the present disclosure, however, are not so limited. Those skilled in the art will be able to readily envisage similar implementations of enhanced story-based, skill-based trophies, collectibles, and trophies for multiplayer accomplishments.

It should be understood that the various embodiments and implementations described herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Aspects of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above implementations and embodiments in mind, it should be understood that aspects of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for enhancing a video game trophy, comprising:

- detecting an end game state to a video game corresponding to award of a trophy;
- extracting metadata relating to a structure of the end game state from gameplay information associated with award of the trophy;
- determining metrics for the end game state from the metadata; and
- applying a drama engine to the metrics for the end game state to generate commentary data corresponding to commentary on award of the trophy.

2. The method of claim 1, further comprising associating the commentary data with trophy data corresponding to the trophy, wherein the commentary data and the trophy data are associated in a way that the commentary on the award of the trophy is presented when the trophy is viewed using the trophy data.

3. The method of claim 1, further comprising generating trophy data corresponding to the trophy and associating the commentary data with trophy data corresponding to the trophy, wherein the commentary data and the trophy data are associated in a way that the commentary on the award of the trophy is presented when the trophy is viewed using the trophy data.

4. The method of claim 1, wherein determining metrics for the end game state from the metadata includes an analysis of a change in metrics between an initial game state and the end game state.

5. The method of claim 4, further comprising recording gameplay information for a video game starting at the initial game state, wherein detecting the end game state includes detecting the end game state from the recorded gameplay information.

6. The method of claim 4, wherein the change in metrics between the initial game state and the end game state includes an amount of time elapsed between the initial game state and the end game state.

7. The method of claim 4, wherein the change in metrics between the initial game state and the end game state includes a change in a player character asset.

8. The method of claim 4, wherein the change in metrics between the initial game state and the end game state includes a change in a player character location.

9. The method of claim 4, further comprising generating a prompt from a timeline of events occurring within the video game between the initial game state and the end game state.

10. The method of claim 9, wherein applying the drama engine to the metrics for the end game state to generate commentary data corresponding to commentary on the award of the trophy includes entering the prompt into a natural language processing artificial intelligence Chabot.

11. The method of claim 1, wherein the commentary data includes synthesized audio commentary data.

12. The method of claim 1, wherein the commentary data includes video data.

13. The method of claim 1, wherein the commentary data includes video data and synthesized audio commentary data.

14. The method of claim 1, wherein the commentary data includes text data.

15. The method of claim 12, wherein applying the drama engine to the metrics for the end game state to generate the commentary data corresponding to the commentary on award of the trophy includes identifying one or more events.

16. A system for enhancing a video game trophy, comprising:

- a trophy module configured to detect an end game state to a video game corresponding to award of a trophy;
- a data capture module configured to extract metadata relating to a structure of the end game state from gameplay information associated with award of the trophy;
- a metric module configured to determine metrics for the end game state from the metadata; and
- a drama engine configured to use the metrics for the end game state to generate commentary data corresponding to commentary on award of the trophy.

17. The system of claim 16, further comprising a recording module configured to record gameplay information for a video game starting at an initial game state.

18. The system of claim 16, wherein the trophy module is configured to detect the end game state from recorded gameplay information.

19. The system of claim 16, and wherein the metric module is configured to determine a change in metrics between an initial game state and an end game state.

20. The system of claim 19, wherein the drama engine is configured to generate a prompt from a timeline of events occurring within the video game between the initial game state and the end game state.

* * * * *